United States Patent
Guo et al.

(10) Patent No.: US 9,879,630 B2
(45) Date of Patent: Jan. 30, 2018

(54) INTAKE OXYGEN SENSOR RATIONALITY DIAGNOSTICS

(71) Applicants: Yichao Guo, Rochester Hills, MI (US); Robert Stack, Grand Blanc, MI (US); Zhijian J Wu, Rochester Hills, MI (US)

(72) Inventors: Yichao Guo, Rochester Hills, MI (US); Robert Stack, Grand Blanc, MI (US); Zhijian J Wu, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 164 days.

(21) Appl. No.: 14/547,223

(22) Filed: Nov. 19, 2014

(65) Prior Publication Data
US 2016/0138527 A1    May 19, 2016

(51) Int. Cl.
| | |
|---|---|
| *F02D 41/00* | (2006.01) |
| *F02D 41/22* | (2006.01) |
| *F02M 26/48* | (2016.01) |
| *F02D 41/14* | (2006.01) |

(52) U.S. Cl.
CPC ....... *F02D 41/222* (2013.01); *F02D 41/0055* (2013.01); *F02D 41/1456* (2013.01); *F02M 26/48* (2016.02); *F02D 41/144* (2013.01); *F02D 41/1439* (2013.01); *F02D 2041/228* (2013.01); *Y02T 10/47* (2013.01)

(58) Field of Classification Search
CPC .... F02D 41/144; F02D 41/0072; Y02T 10/47; F02M 25/0702; F02M 25/072; F02M 25/0756; F02M 25/0771

USPC .................. 701/108, 109; 123/704
See application file for complete search history.

(56) References Cited

U.S. PATENT DOCUMENTS

| | | |
|---|---|---|
| 6,739,177 B2 | 5/2004 | Sato et al. |
| 7,318,409 B2 | 1/2008 | Cullen |
| 8,775,011 B2 | 7/2014 | Makki et al. |
| 2002/0100463 A1* | 8/2002 | Jaliwala ............. F02D 41/0072 123/568.21 |
| 2012/0265396 A1* | 10/2012 | Makki ................ F02D 41/1495 701/30.8 |

(Continued)

*Primary Examiner* — Hai Huynh
*Assistant Examiner* — Gonzalo Laguarda
(74) *Attorney, Agent, or Firm* — Ralph E Smith

(57) ABSTRACT

Rationality diagnostic techniques for an intake oxygen sensor are utilized to detect sensor malfunction. A non-intrusive diagnostic technique includes passively detecting when an exhaust gas recirculation (EGR) valve position crosses low/high position thresholds, whereas an intrusive diagnostic technique includes actively commanding the EGR valve to predetermined low/high positions. During a period after the EGR valve position reaches/crosses at least one of the low/high positions/position thresholds, respectively, maximum and minimum intake oxygen concentration is monitored. When the EGR valve position has crossed both the low/high positions/position thresholds and a difference between the maximum and minimum oxygen concentrations is less than a respective difference threshold, a malfunction of the intake oxygen sensor is detected. A malfunction indicator lamp (MIL) could be set to indicate the malfunction. The intrusive technique is additionally or alternatively implemented, such as part of a verification or backup to the non-intrusive technique.

10 Claims, 3 Drawing Sheets

(56) References Cited

U.S. PATENT DOCUMENTS

| | | | | |
|---|---|---|---|---|
| 2014/0014079 A1* | 1/2014 | Yacoub | ............... | F02D 41/144 |
| | | | | 123/568.16 |
| 2014/0238369 A1* | 8/2014 | Jankovic | ............... | F02D 41/144 |
| | | | | 123/690 |
| 2015/0053186 A1* | 2/2015 | Surnilla | ............... | F02M 26/07 |
| | | | | 123/568.21 |
| 2015/0075502 A1* | 3/2015 | Surnilla | ............... | F02M 25/08 |
| | | | | 123/520 |
| 2015/0075503 A1* | 3/2015 | Surnilla | ............ | F02M 25/0854 |
| | | | | 123/520 |
| 2015/0101327 A1* | 4/2015 | Clark | ............... | F02D 41/0052 |
| | | | | 60/599 |
| 2015/0113948 A1* | 4/2015 | Surnilla | ............... | F02D 41/005 |
| | | | | 60/274 |
| 2015/0114346 A1* | 4/2015 | Surnilla | ............ | F02D 41/0007 |
| | | | | 123/349 |
| 2015/0121864 A1* | 5/2015 | Surnilla | ............ | F02D 41/0052 |
| | | | | 60/605.2 |
| 2015/0128916 A1* | 5/2015 | Surnilla | ............ | F02M 25/0753 |
| | | | | 123/568.12 |
| 2015/0240730 A1* | 8/2015 | Styles | ............... | F02D 41/144 |
| | | | | 123/393 |
| 2015/0292428 A1* | 10/2015 | Hakeem | ............... | F02D 41/144 |
| | | | | 701/104 |

* cited by examiner

INTAKE OXYGEN SENSOR RATIONALITY DIAGNOSTICS

FIELD

The present application relates generally to engine diagnostic systems and, more particularly, to intake oxygen sensor rationality diagnostics.

BACKGROUND

Engines combust an air mixture and fuel within cylinders to generate drive torque. In some engines, exhaust gas resulting from the combustion is recirculated and combined with fresh air and to create the air mixture for combustion. This process is known as exhaust gas recirculation (EGR). In one implementation, the exhaust gas is recirculated from an exhaust manifold through an external EGR pipe regulated by an EGR valve and into an induction system. One benefit of EGR is a lower oxygen concentration in the air mixture, which causes decreased combustion temperatures and the generation of less nitrogen oxides (NOx).

In some engine systems, an intake oxygen sensor is implemented in the induction system to measure the oxygen concentration in the air mixture. Measurements of the intake oxygen sensor could be utilized as feedback for controlling the EGR valve. Because of a low pressure drop across the EGR valve, current diagnostic systems may not accurately detect malfunctions of the intake oxygen sensors. Therefore, while these intake oxygen sensor diagnostic systems work for their intended purpose, there remains a need for improvement in the relevant art.

SUMMARY

In accordance with an aspect of the invention, a diagnostic system is provided. In one exemplary implementation, the diagnostic system includes an intake oxygen sensor configured to measure an oxygen concentration in an induction system of an engine at a point downstream from an exhaust gas recirculation (EGR) port and upstream from a throttle valve. The diagnostic system includes an EGR valve position sensor configured to measure a position of an EGR valve, the EGR valve being configured to control a flow of EGR to the EGR port. The diagnostic system also includes a controller configured to perform a non-intrusive rationality diagnostic for the intake oxygen sensor. The non-intrusive rationality diagnostic comprises detecting when the EGR valve position measured by the EGR valve position sensor has crossed low and high position thresholds, during a period after detecting that the EGR valve position has crossed one of the low and high position thresholds, determining maximum and minimum oxygen concentration measured by the intake oxygen sensor, and in response to the detecting that the EGR valve position has crossed both the low and high position thresholds, detecting a malfunction of the intake oxygen sensor based on a comparison between (i) a difference between the maximum and minimum oxygen concentrations and (ii) a difference threshold indicative of an acceptable range of measurement by the intake oxygen sensor.

In accordance with an aspect of the invention, another diagnostic system is provided. In one exemplary implementation, the diagnostic system includes an intake oxygen sensor configured to measure an oxygen concentration in an induction system of an engine at a point downstream from an EGR port and upstream from a throttle valve. The diagnostic system includes an EGR valve position sensor configured to measure a position of an EGR valve, the EGR valve being configured to control a flow of EGR to the EGR port. The diagnostic system also includes a controller configured to perform an intrusive rationality diagnostic for the intake oxygen sensor. The intrusive rationality diagnostic comprises: commanding the EGR valve to predetermined low and high positions based on feedback from the EGR valve position sensor, during a period after the EGR valve position reaches at least one of the predetermined low and high positions, determining maximum and minimum oxygen concentrations measured by the intake oxygen sensor, and in response to the EGR valve position reaching both the predetermined low and high positions, detecting a malfunction of the intake oxygen sensor based on a comparison between (i) a difference between the maximum and minimum oxygen concentrations and (ii) a difference threshold indicative of an acceptable range of measurement by the intake oxygen sensor.

In one exemplary implementation, the controller is configured to detect the malfunction of the intake oxygen sensor when the difference between the maximum and minimum oxygen concentrations is less than the difference threshold. In one exemplary implementation, the difference thresholds for the non-intrusive and intrusive diagnostic techniques are the same. In another exemplary implementation, the difference thresholds for the non-intrusive and intrusive diagnostic techniques are different. In one exemplary implementation, the controller is configured to perform the intrusive rationality diagnostic when the non-intrusive rationality diagnostic has not been performed during a predetermined period.

In one exemplary implementation, the period(s) are based on a transport delay for exhaust gas to flow from the EGR valve to the intake oxygen sensor. In one exemplary implementation, the low and high position thresholds for the EGR valve represent positions corresponding to an acceptable expected change in measured oxygen concentration.

In one exemplary implementation, the controller is further configured to determine an enable condition for performing the non-intrusive rationality diagnostic, the enable condition comprising the lack of an intrusive rationality diagnostic for the intake oxygen sensor being currently requested. In one exemplary implementation, the enable condition further comprises at least one of: (i) voltage and status of the intake oxygen sensor are within predetermined acceptable ranges, (ii) no malfunctions of the EGR valve or the EGR valve position sensor, (iii) no circuit fault in the intake oxygen sensor or a heater associated therewith, and (iv) no communication issue between the intake oxygen sensor and the controller.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed implementations and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
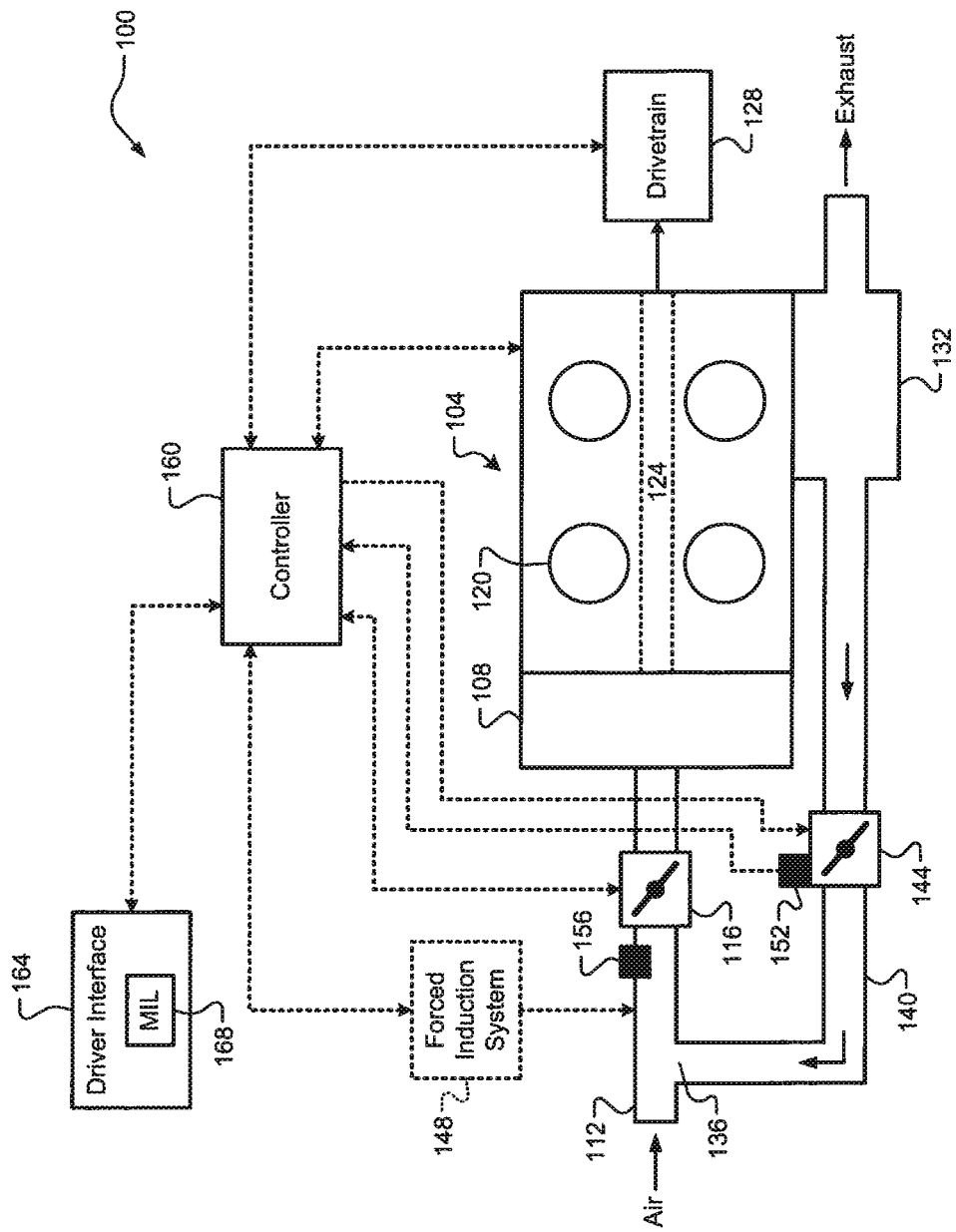
FIG. 1 is an example diagram of an engine system according to the principles of the present disclosure.

As previously discussed, there remains a need for improvement in the art of intake oxygen sensor diagnostic techniques. In particular, sensor rationality diagnostic techniques are needed for verifying the measurement range of an intake oxygen sensor. Accordingly, intrusive and non-intrusive intake oxygen sensor rationality diagnostic techniques are presented. In some implementations, both of these techniques are utilized to provide for a more robust rationality diagnostic. In one exemplary implementation, the non-intrusive technique involves detecting when the EGR valve position crosses low and high position thresholds. During a period after the EGR valve position crosses at least one of the low and high position thresholds, maximum and minimum intake oxygen concentration is monitored. This period is sufficiently long to compensate for a transport delay for exhaust gas to flow from the EGR valve to the intake oxygen sensor.

When the EGR valve position has crossed both the low and high position thresholds and a difference between the maximum and minimum oxygen concentrations is less than a difference threshold, a malfunction of the intake oxygen sensor is detected. The low/high position thresholds for the EGR valve represent positions corresponding to an acceptable expected change in measured oxygen concentration (i.e., to accurately perform the non-intrusive rationality diagnostic). The difference threshold is indicative of an acceptable range of measurement for the intake oxygen sensor. Additionally or alternatively, an intrusive rationality diagnostic technique could be performed.

In one exemplary implementation, the intrusive technique involves commanding the EGR valve to predetermined low/high positions. These predetermined low/high positions for the EGR valve also represent positions corresponding to an acceptable expected change in measured oxygen concentration. Similar to the non-intrusive technique, the maximum/minimum oxygen concentrations are then captured and compared to another difference threshold to detect the malfunction of the intake oxygen sensor. This other difference threshold also represents an acceptable expected change in measured oxygen concentration. In some implementations, this other difference threshold is the same as the difference threshold for the non-intrusive technique, but it will be appreciated that they could be different (e.g., due to different low/high comparative positions). The intrusive technique could be utilized instead of the non-intrusive technique or merely as a back-up or secondary diagnostic technique, such as for malfunction verification or in the event that the non-intrusive technique never runs during a predetermined period.

In some implementations, the techniques are configured to perform a bookkeeping function where monitoring occurs and a malfunction count is maintained. For example, the malfunction count could be increased each time the difference between the maximum/minimum oxygen concentrations is less than a respective difference threshold, thus indicating that the intake oxygen sensor is not measuring oxygen concentration across an appropriate range. In these implementations, the malfunction of the intake oxygen sensor is not detected until a predetermined malfunction count is reached. Doing so could prevent accidental or incorrect service trips in response to a malfunction indicator (e.g., a malfunction indicator lamp, or MIL, being set).

Referring now to FIG. 1, an example diagram of an engine system 100 is illustrated. The engine system 100 includes an engine 104 configured to generate drive torque. The engine 104 draws an air mixture into an intake manifold 108 through an induction system 112 that is regulated by a throttle or throttle valve 116. The air mixture in the intake manifold 108 is combined with fuel and distributed to a plurality of cylinders 120. While four cylinders are shown, it will be appreciated that other numbers of cylinders could be implemented. The combustion of the air/fuel mixture within the cylinders 120 drives pistons (not shown) that rotatably turn a crankshaft 124 and generate drive torque. The drive torque 124 is then transferred to a drivetrain 128 of a vehicle comprising the engine system 100.

Exhaust gas resulting from the combustion is expelled from the cylinders 120 into an exhaust system 132. The exhaust system 132 treats at least a portion of the exhaust gas to decrease or eliminate emissions before releasing it into the atmosphere. At least a portion of the exhaust gas could also be recirculated back into the induction system 112 at an EGR port 136 via an external EGR system comprising an EGR pipe 140 and an EGR valve 144 that regulates the flow of exhaust gas through the EGR pipe 140. The recirculated exhaust gas is combined with fresh air to create the air mixture. In some implementations, the engine 104 has a forced induction system 148. Examples of the forced induction system 148 include a supercharger and a turbocharger. The forced induction system 148 forces a larger amount of the air mixture through the induction system 112 and into the cylinders 120, thereby providing for greater torque potential.

An EGR valve position sensor 152 is configured to measure a relative position of the EGR valve 144. In one exemplary implementation, two EGR valve position sensors 152 are implemented corresponding to 0% open (100% closed) and 100% open (0% closed), respectively. An intake oxygen sensor 156 is positioned downstream from the EGR port 136 and upstream from the throttle 116. The intake oxygen sensor 156 is configured to measure an oxygen concentration of the air mixture in the induction system 112. While not shown, it will be appreciated that the intake oxygen sensor 156 could comprise a heater and condensation shielding/protection. For example only, the measurements from the intake oxygen sensor 156 could be utilized as feedback for controlling the EGR valve 144.

A controller 160 controls operation of the engine system 100. It will be appreciated that the term "controller" as used herein refers to any suitable control system, such as an electronic controller having one or more processors or one or more application specific integrated circuits (ASICs). For example, the controller 160 could control the throttle 116 (electronic throttle control, or ETC), fuel injectors (not shown), spark plugs (not shown), the drivetrain 128, the exhaust system 132, and/or the EGR valve 144. The controller 160 also receives measurements such as throttle position, crankshaft position, EGR valve position, and intake oxygen concentration. The controller 160 also communicates with a driver interface 164. Specifically, a driver of the vehicle comprising the engine system 100 could provide a torque request via the driver interface 160. The driver interface 164 also includes a malfunction indicator lamp (MIL) 168 configured to illuminate when a malfunction is detected. For purposes of this disclosure, the MIL 168 is associated with the malfunction of the intake oxygen sensor 156.

Figure 2:
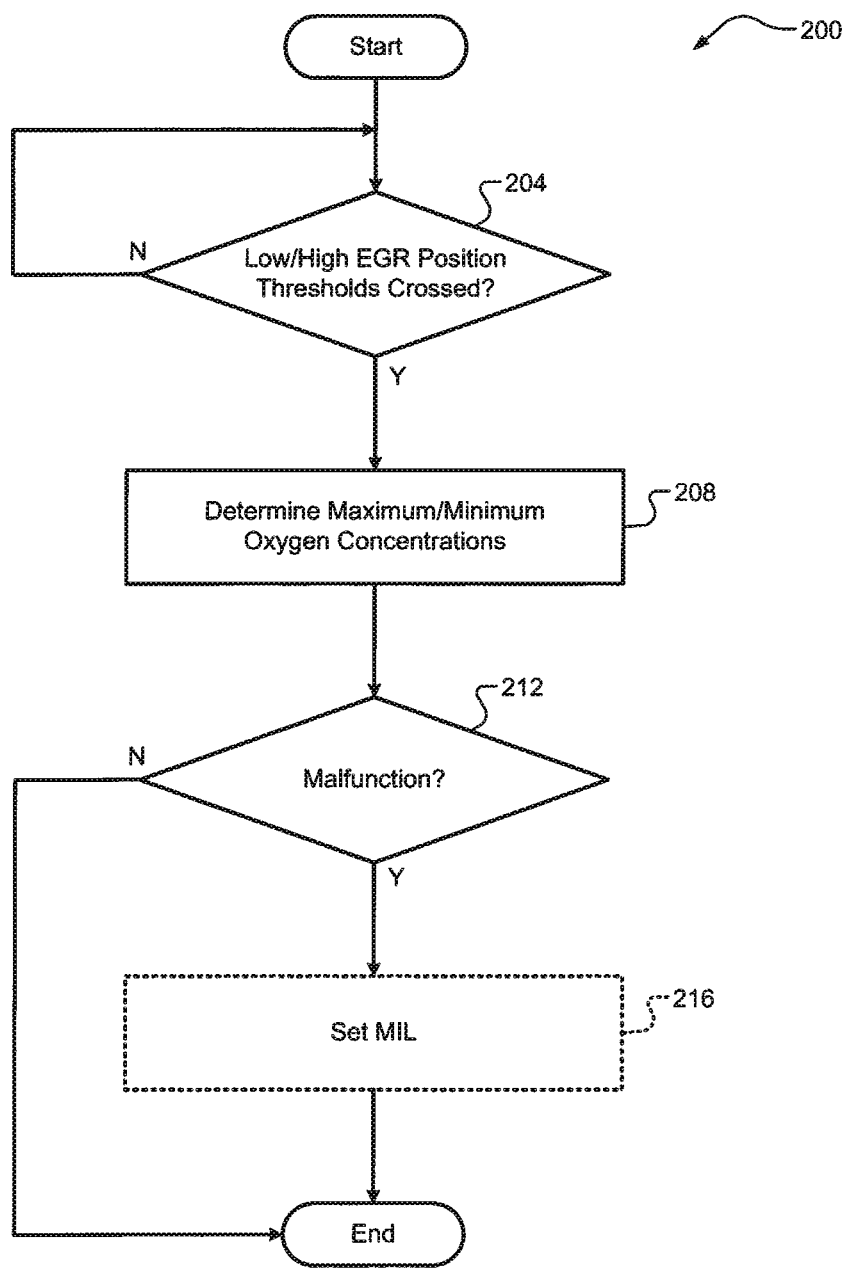
FIG. 2 is an example flow diagram of a non-intrusive intake oxygen sensor rationality diagnostic technique according to the principles of the present disclosure.

Referring now to FIG. 2, an example flow diagram of a non-intrusive intake oxygen sensor rationality diagnostic technique 200 is illustrated. At 204, the controller 160 detects whether the EGR valve position measured by the EGR valve position sensor 152 has crossed the low and high position thresholds. If true, the technique 200 proceeds to 208. If false, the technique 200 ends or returns to 204. At 208, during a period after detecting that the EGR valve position has crossed one of the low and high position thresholds, the controller 160 determines maximum and minimum oxygen concentration measured by the intake oxygen sensor 156. At 212, in response to the detecting that the EGR valve position has crossed both the low and high position thresholds, the controller 160 detects a malfunction of the intake oxygen sensor 156 based on a comparison between (i) a difference between the maximum and minimum oxygen concentrations and (ii) a difference threshold indicative of an acceptable range of measurement by the intake oxygen sensor 156. The technique 200 then ends or returns to 204. Optionally, at 216, the controller 160 could set the MIL 168 in response to detecting the malfunction of the intake oxygen sensor 156 at 312. The technique 200 then ends or returns to 204.

In some implementations, the non-intrusive diagnostic technique 200 has an enable condition that must be satisfied to proceed. The enable condition comprises the lack of an intrusive rationality diagnostic being currently requested. In other words, at least one part of the enable condition for the non-intrusive rationality diagnostic is that the intrusive rationality diagnostic is not currently being requested, which could otherwise override performing the non-intrusive rationality diagnostic. In other implementations, the enable condition additionally or alternatively comprises at least one of: (i) voltage and status of the intake oxygen sensor 156 are normal (e.g., within predetermined acceptable ranges), (iii) no malfunctions of the EGR valve 144 or the EGR valve position sensor 152, (iv) no circuit fault in the intake oxygen sensor 156 or a heater (not shown) associated therewith, and (v) no communication issue between the intake oxygen sensor 156 and the controller 160. When the enable condition is satisfied, the non-intrusive diagnostic technique 200 is operable to be performed.

It will be appreciated that the non-intrusive diagnostic technique 200 is configured to begin measuring for the maximum/minimum oxygen concentrations at any suitable time. In one exemplary implementation, the non-intrusive diagnostic technique 200 begins this monitoring after detecting that the EGR valve position has crossed one of the low/high position thresholds. This monitoring could then continue until after the EGR valve position has crossed the other position threshold, while also accounting for the exhaust gas transport delay. Furthermore, it will be appreciated that the non-intrusive diagnostic technique 200 could be implemented along with the intrusive diagnostic technique, which is described in greater detail below.

Figure 3:
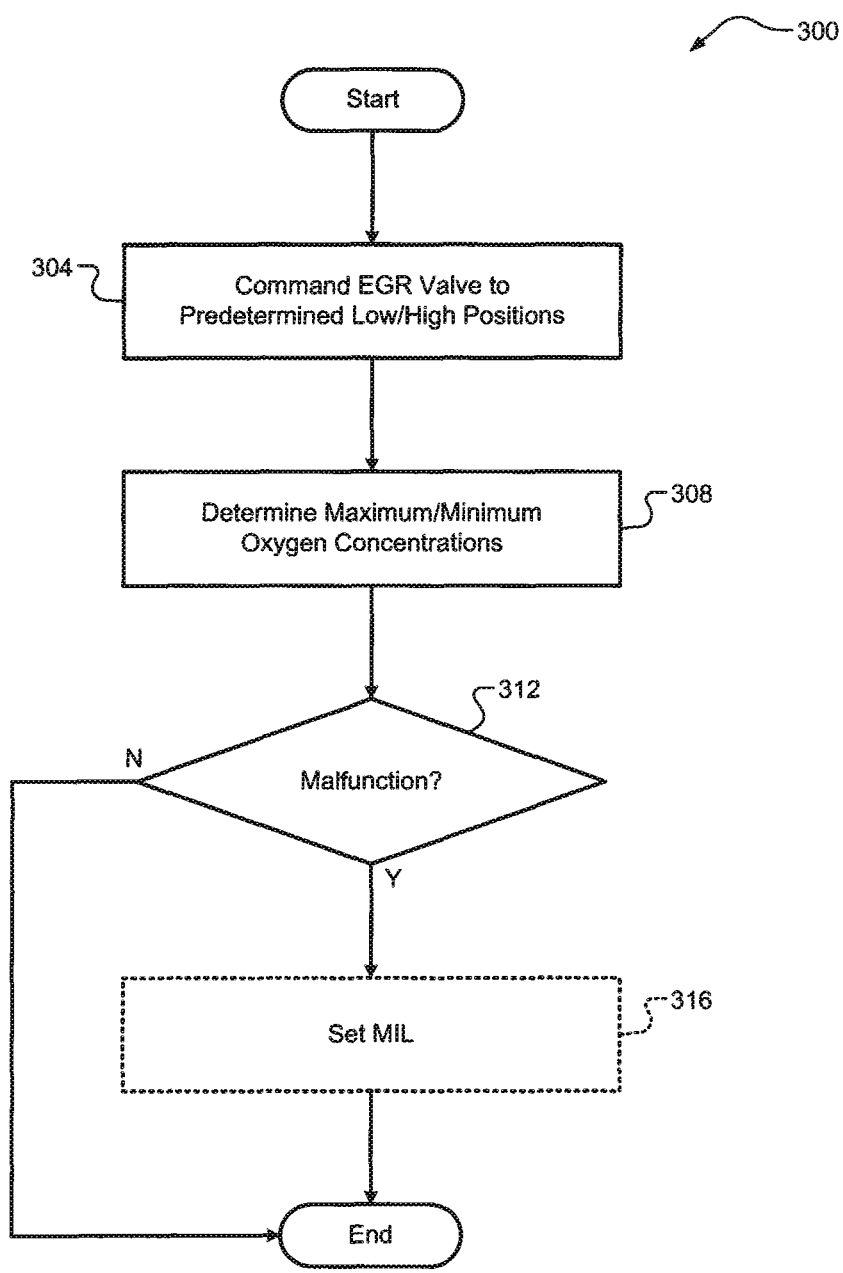
FIG. 3 is an example flow diagram of an intrusive intake oxygen sensor rationality diagnostic technique according to the principles of the present disclosure.

Referring now to FIG. 3, an example flow diagram of an intrusive intake oxygen sensor rationality diagnostic technique 300 is illustrated. At 304, the controller 160 commands the EGR valve 144 to predetermined low and high positions based on feedback from the EGR valve position sensor 152. At 308, during another period after the EGR valve 144 reaches at least one of the predetermined low and high positions, the controller 160 determines the maximum and minimum oxygen concentrations measured by the intake oxygen sensor 156. At 312, in response to the EGR valve 156 reaching both the predetermined low and high positions, the controller 160 detects the malfunction of the intake oxygen sensor 156 based on a comparison between (i) the difference between the maximum and minimum oxygen concentrations and (ii) another difference threshold indicative of an acceptable range of measurement by the intake oxygen sensor 156. Optionally, at 316, the controller 160 could set the MIL 168 in response to detecting the malfunction of the intake oxygen sensor 156 at 312. The technique 200 then ends or returns to 204.

As discussed above with respect to the non-intrusive diagnostic technique 200 and FIG. 2, the intrusive diagnostic technique 300 could have a similar enable condition or, as described, a status of the intrusive diagnostic technique 300 could be part of the enable condition for the non-intrusive diagnostic technique 200. Similar to the non-intrusive diagnostic technique 200, it will be appreciated that the non-intrusive diagnostic technique 300 is configured to begin measuring for the maximum/minimum oxygen concentrations at any suitable time. In one exemplary implementation, the non-intrusive diagnostic technique 300 begins this monitoring after detecting that the EGR valve position has reached one of the predetermined low/high positions. This monitoring could then continue until after the EGR valve position has reached the other predetermined position, while also accounting for the exhaust gas transport delay. Furthermore, it will be appreciated that the intrusive diagnostic technique 300 could be implemented along with the intrusive diagnostic technique 200 described above. In one exemplary implementation, the intrusive diagnostic technique 300 could be performed when the non-intrusive diagnostic technique 200 has not run for a predetermined period. This predetermined period could be government-specified, for example only, once every vehicle trip.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A diagnostic system for a vehicle, the diagnostic system comprising:
   an intake oxygen sensor configured to measure an oxygen concentration in an induction system of an engine at a point downstream from an exhaust gas recirculation (EGR) port and upstream from a throttle valve;
   an EGR valve position sensor configured to measure a position of an EGR valve; and
   a controller configured to:
     operate the vehicle, including operating the EGR valve within a full range of potential positions;
     detect when the EGR valve position measured by the EGR valve position sensor has crossed first and second diagnostic positions, wherein a difference between the first and second diagnostic positions represent an acceptable range of EGR valve positions for determining an acceptable range of measurement of the intake oxygen sensor;
     during a first period (I) after detecting that the EGR valve position has crossed only one of the first and second diagnostic positions and (ii) before a first delayed time, determine first maximum and minimum oxygen concentrations measured by the intake oxygen sensor across the first period, the first delayed time being a time at which the EGR valve position crosses the other of the first and second diagnostic positions as adjusted by an exhaust gas transport delay time;

after the first period, calculating a first actual range of measurement of the intake oxygen sensor, the first actual range of measurement being equal to a difference between the first maximum and minimum oxygen concentrations measured by the intake oxygen sensor during the first period;

detect a first sensor range malfunction of the intake oxygen sensor when the first actual range of measurement is less than a difference threshold indicative of the acceptable range of measurement by the intake oxygen sensor; and in response to detecting the first sensor range malfunction of the intake oxygen sensor, actuate a malfunction indicator lamp (MIL).

2. The diagnostic system of claim 1, wherein the exhaust gas transport delay time is a time delay for exhaust gas to flow from the EGR valve to the intake oxygen sensor.

3. The diagnostic system of claim 1, wherein the controller is further configured to, during operation of the vehicle, verify at least one of:
(i) no malfunctions of the EGR valve or the EGR valve position sensor;
(ii) no circuit fault in the intake oxygen sensor or a heater associated therewith; and
(iii) no communication issue between the intake oxygen sensor and the controller.

4. The diagnostic system of claim 1, wherein when the position of the EGR valve as measured by the EGR position sensor has not crossed both of the first and second diagnostic positions during a predetermined period, the controller is further configured to:

adjust operation of the vehicle, including commanding the EGR valve to the first and second diagnostic positions based on feedback from the EGR valve position sensor;

during a second period (I) after the EGR valve position reaches only one of the first and second diagnostic positions and (ii) before a second delayed time, determine second maximum and minimum oxygen concentrations from a second plurality of measured oxygen concentrations measured by the intake oxygen sensor across the second period, the second delayed time being a time at which the EGR valve position reaches the other of the first and second diagnostic positions as adjusted by the second exhaust gas transport delay time; and after the second period, calculate a second actual range of measurement of the intake oxygen sensor, the second actual range of measurement being a difference between the second maximum and minimum oxygen concentrations measured by the intake oxygen sensor during the second period;

detect a second sensor range malfunction of the intake oxygen sensor when the second actual range of measurement of the intake oxygen sensor is less than the difference threshold indicative of the acceptable range of measurement by the intake oxygen sensor.

5. The diagnostic system of claim 1, wherein the controller is further configured to, during operation of the vehicle, verify each of:
(i) no malfunctions of the EGR valve or the EGR valve position sensor;
(ii) no circuit fault in the intake oxygen sensor or a heater associated therewith; and
(iii) no communication issue between the intake oxygen sensor and the controller.

6. A diagnostic system for a vehicle, the diagnostic system comprising:

an intake oxygen sensor configured to measure an oxygen concentration in an induction system of an engine at a point downstream from an exhaust gas recirculation (EGR) port and upstream from a throttle valve;

an EGR valve position sensor configured to measure a position of an EGR valve; and a controller configured to:
operate the vehicle, including operating the EGR valve within a full range of potential positions; and when the position of the EGR valve, during a predetermined period, has not crossed both first and second diagnostic positions, wherein a difference between the first and second diagnostic positions represent an acceptable range of EGR valve positions for determining an acceptable range of measurement of the intake oxygen sensor:

adjust operation of the vehicle, including commanding the EGR valve to the first and second diagnostic positions based on feedback from the EGR valve position sensor;

during a first period (i) after the EGR valve position reaches only one of the first and second diagnostic positions and (ii) before a first delayed time, determine first maximum and minimum oxygen concentrations measured by the intake oxygen sensor, the first delayed time being a time at which the EGR valve position reaches the other of the first and second diagnostic positions as adjusted by an exhaust gas transport delay time;

after the first period, calculate a first actual range of measurement of the intake oxygen sensor, the first actual range of measurement being equal to a difference between the first maximum and minimum oxygen concentrations measured by the intake oxygen sensor during the first period;

detect a first sensor range malfunction of the intake oxygen sensor when the first actual range of measurement is less than a difference threshold indicative of the acceptable range of measurement by the intake oxygen sensor; and in response to detecting the first sensor range malfunction of the intake oxygen sensor, actuate a malfunction indicator lamp (MIL).

7. The diagnostic system of claim 6, wherein the exhaust gas transport delay time is a time delay for exhaust gas to flow from the EGR valve to the intake oxygen sensor.

8. The diagnostic system of claim 6, wherein the controller is further configured to, during operation of the vehicle, verify at least one of:
(i) no malfunctions of the EGR valve or the EGR valve position sensor;
(ii) no circuit fault in the intake oxygen sensor or a heater associated therewith; and
(iii) no communication issue between the intake oxygen sensor and the controller.

9. The diagnostic system of claim 6, wherein the controller is further configured to during the operation of the vehicle, detect that the EGR valve position measured by the EGR valve position sensor has crossed both the first and second diagnostic positions during the predetermined period and, in response:

during a second period (i) after detecting that the EGR valve position has crossed only one of the first and second diagnostic positions and (ii) before a second delayed time, determining second maximum and minimum oxygen concentrations measured by the intake oxygen sensor across the second period, the second delayed time being a time at which the EGR valve position crosses the other of the first and second diagnostic positions as adjusted by the exhaust gas transport delay time;

after the second period, calculating a second actual range of measurement of the intake oxygen sensor, the second actual range of measurement being equal to a difference between the second maximum and minimum oxygen concentrations measured by the intake oxygen sensor during the second period; and detecting a second sensor range malfunction of the intake oxygen sensor when the second actual range of measurement is less than the difference threshold indicative of the acceptable range of measurement by the intake oxygen sensor.

10. The diagnostic system of claim 6, wherein the controller is further configured to, during operation of the vehicle, verify each of: (i) no malfunctions of the EGR valve or the EGR valve position sensor; (ii) no circuit fault in the intake oxygen sensor or a heater associated therewith; and (iii) no communication issue between the intake oxygen sensor and the controller.

* * * * *